(12) United States Patent
Matsubara et al.

(10) Patent No.: US 7,617,108 B2
(45) Date of Patent: Nov. 10, 2009

(54) VEHICLE MOUNTED CONTROL APPARATUS

(75) Inventors: Tsutomu Matsubara, Tokyo (JP); Masato Hirai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 613 days.

(21) Appl. No.: 10/506,890

(22) PCT Filed: Dec. 12, 2003

(86) PCT No.: PCT/JP03/15993

§ 371 (c)(1), (2), (4) Date: Sep. 7, 2004

(87) PCT Pub. No.: WO2004/070703

PCT Pub. Date: Aug. 19, 2004

(65) Prior Publication Data

US 2005/0125233 A1    Jun. 9, 2005

(30) Foreign Application Priority Data

Feb. 3, 2003   (JP) .............................. 2003-026107

(51) Int. Cl.
*G10L 21/00* (2006.01)

(52) U.S. Cl. .................. 704/275; 704/276; 704/270

(58) Field of Classification Search ................ 704/231, 704/235, 246, 250, 270, 270.1, 275, 276, 704/255, 251, 2, 277, 245

See application file for complete search history.

(56) References Cited

U.S. PATENT DOCUMENTS

| | | | | |
|---|---|---|---|---|
| 5,867,817 | A * | 2/1999 | Catallo et al. | 704/255 |
| 5,956,668 | A * | 9/1999 | Alshawi et al. | 704/2 |
| 6,298,324 | B1 * | 10/2001 | Zuberec et al. | 704/251 |
| 7,379,876 | B2 * | 5/2008 | Nakata | 704/275 |

FOREIGN PATENT DOCUMENTS

| | | | |
|---|---|---|---|
| JP | 9-292895 | A | 11/1997 |
| JP | 10-227646 | A | 8/1998 |
| JP | 11-126092 | A | 5/1999 |
| JP | 11-352995 | A | 12/1999 |
| JP | 2000-9480 | A | 1/2000 |
| JP | 2000-97719 | A | 4/2000 |
| JP | 2000-181488 | A | 6/2000 |
| JP | 2000-338991 | A | 12/2000 |
| JP | 2001-194166 | A | 7/2001 |
| JP | 2002-23903 | A | 1/2002 |
| JP | 2002-220012 | A | 8/2002 |
| JP | 2002-259114 | A | 9/2002 |

* cited by examiner

*Primary Examiner*—Huyen X. Vo
(74) *Attorney, Agent, or Firm*—Birch, Stewart, Kolasch & Birch, LLP

(57) ABSTRACT

A vehicle mounted control apparatus includes voice recognition section for recognizing a voice command input by an voice input device; and a control section that analyzes a cause of incapability of recognition of the voice command when the voice command cannot be recognized by the voice recognition section and gives a notice on result of the analysis.

20 Claims, 6 Drawing Sheets

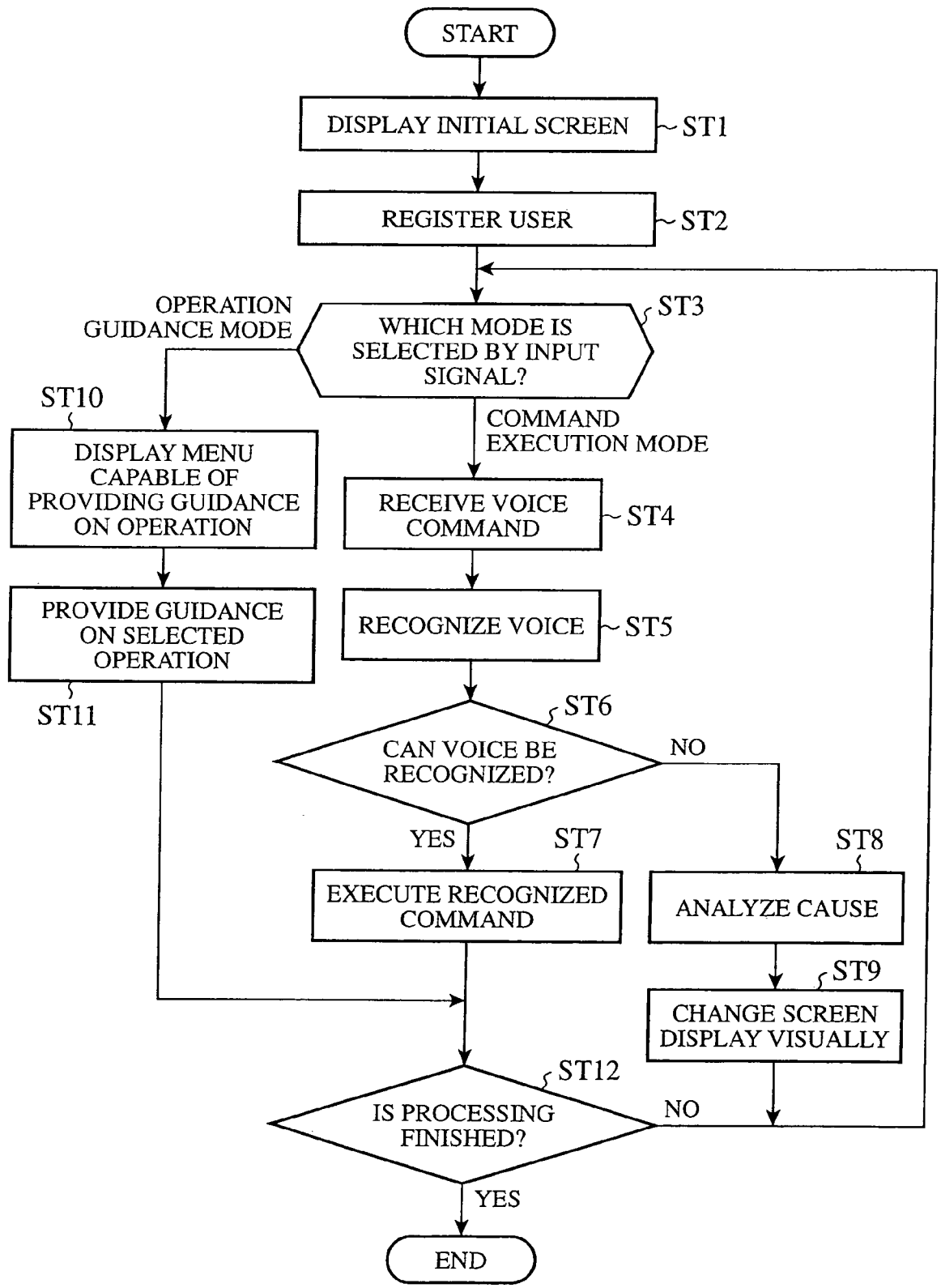

FIG.7

| ANALYSIS RESULT | DISPLAY FORMAT |
|---|---|
| SOUND LEVEL IS LOW | GREENISH SKY BLUE |
| SOUND LEVEL IS HIGH | BLUE |
| UTTERING SPEED IS SLOW | YELLOWISH GREEN |
| UTTERING SPEED IS FAST | GREEN |
| UTTERING TIMING IS LATE | PINK |
| UTTERING TIMING IS EARLY | RED |
| SENTENCE IS ACCOMPANIED BY INCIDENTAL WORD | YELLOW |

FIG.8

| CONTENT OF VOICE COMMAND | EXAMPLE SENTENCE |
|---|---|
| (a) PERIPHERAL FACILITY RETRIEVAL | "NEAR CONVENIENCE STORE" |
| (b) ADDRESS RETRIEVAL | "XX MINATO-KU, TOKYO" |
| (c) FACILITY RETRIEVAL | "YY ZOO, TOKYO" |
| (d) DESTINATION SETTING | "GO TO ZZ" |
| (e) CONTROL COMMAND OTHER THAN ROUTE SETTING | "TWO SCREENS " |

US 7,617,108 B2

VEHICLE MOUNTED CONTROL APPARATUS

BACKGROUND OF THE INVENTION

1. Field of the Invention

The present invention relates to a vehicle mounted control apparatus for performing a control in accordance with a voice command.

2. Description of the Related Art

There has conventionally been provided a car navigation apparatus that outputs a conversational operating instruction by means of a screen or a voice to assist the key entry of a command by a user (for example, patent document 1).

Moreover, a car navigation apparatus that can directly receive a command by a voice in a command execution mode while it does not display an operating procedure, has also been provided as a method capable of entering a command more quickly by entering a conversational command.

[Patent Document] Japanese Unexamined Patent Publication No. 2000-97719

However, when a command by a voice (hereinafter referred to as "voice command") is entered to a car navigation apparatus, depending on user's vocal conditions (for example, the level of voice uttered by a user), the car navigation apparatus cannot recognize the voice in some cases. In these cases, the user cannot understand which of the following reasons makes it impossible for the car navigation apparatus to recognize the voice and hence is embarrassed: a voice command is improperly issued; vocal conditions are not good; and further, the apparatus is not operated because a switch for performing voice recognition is not pressed.

Therefore, it is an object of the present invention to provide a vehicle mounted control apparatus that can inform a user about the state of recognition of a voice command uttered by the user in such a way that the user can easily understand the state of recognition.

SUMMARY OF THE INVENTION

A vehicle mounted control apparatus of the present invention includes voice recognition section for recognizing a voice command input by an voice input device; and a control section that analyzes a cause of incapability of recognition of the voice command when the voice command cannot be recognized by the voice recognition section and gives a notice on result of the analysis.

By this arrangement the control apparatus can provide the user with an occasion of practice of operation when the user wants to know an operating method and makes the user acquire the operation effectively. Moreover, the vehicle mounted control apparatus can also finish learning a parameter for recognizing the voice of the user through the practice for acquiring this operating method. Hence, it is possible to produce an effect of improving the rate of voice recognition and decreasing a work of the user even if the user does not conduct an additional work of inputting voice for the vehicle mounted control apparatus to be learned about voice of the user.

BRIEF DESCRIPTION OF THE DRAWINGS

FIG. 3 is a flow chart to show the whole processing of the vehicle mounted control apparatus in accordance with embodiment of the present invention.

FIG. 4A illustrates the display content in which is displayed an icon for displaying the state of reception of voice and FIG. 4B illustrates the display content by which is displayed providing the user with the state of operation.

FIG. 6A illustrates the display content to provide the user with a menu capable of providing guidance on an operation and FIG. 6B illustrates the display content to provide the user with the content of a selected operation.

FIG. 7 is an illustration to show the correspondence between analysis result and display format which is stored in memory of the vehicle mounted control apparatus of embodiment of the present invention.

FIG. 8 is an illustration to show the correspondence between the content of voice command and their example sentences which are stored in memory of the vehicle mounted control apparatus of embodiment of the present invention.

BEST MODE FOR CARRYING OUT THE INVENTION

In order to describe the present invention in more detail, the best mode for carrying out the present invention will be hereafter described with reference to the accompanying drawings.

Embodiment 1

Figure 1:
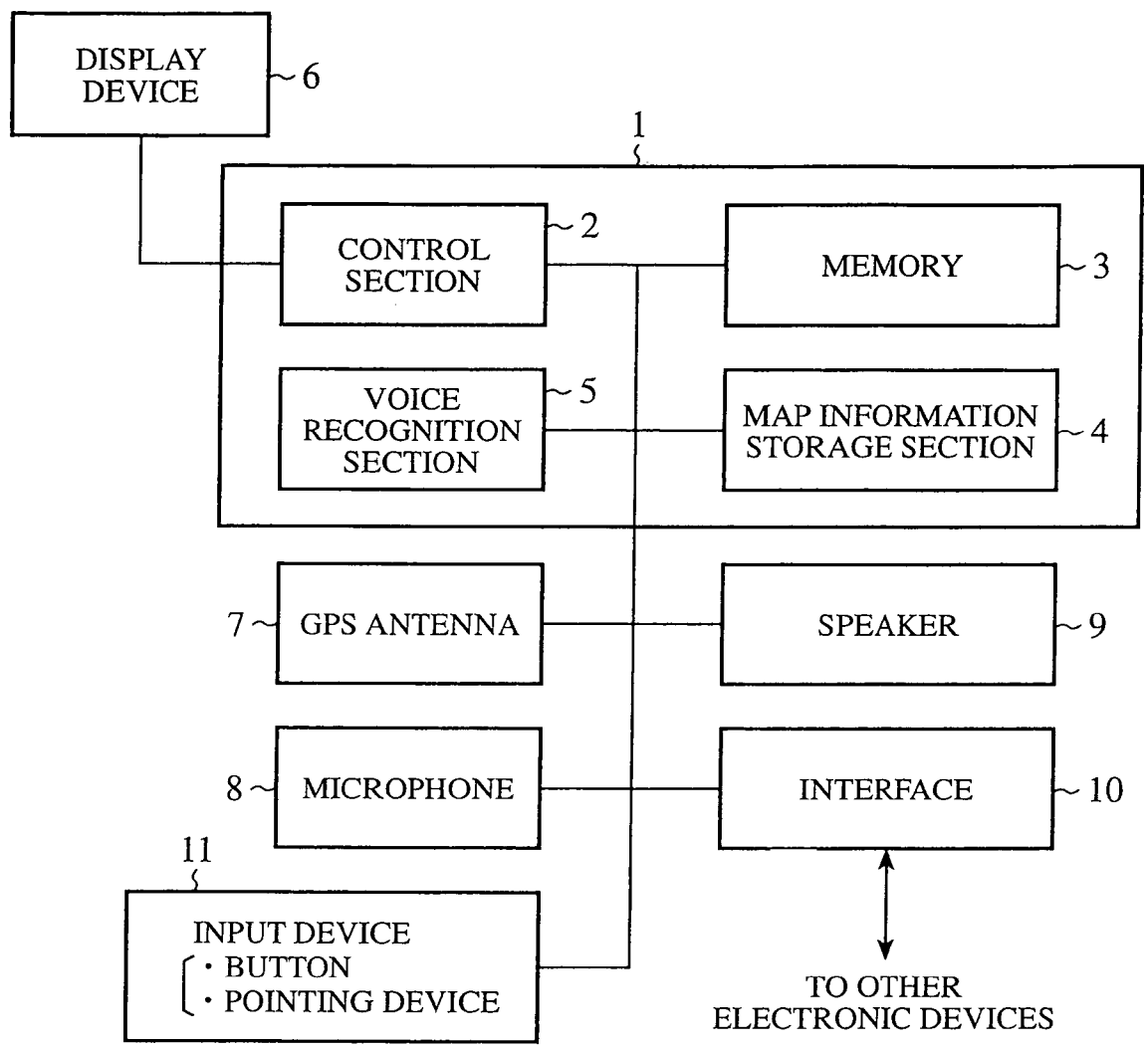
FIG. 1 is a function block diagram to show a vehicle mounted control apparatus in accordance with embodiment of the present invention.

FIG. 1 shows a vehicle mounted control apparatus of this embodiment 1 and a car navigation apparatus is here shown as one example of the apparatus. In FIG. 1, a main device 1 includes a control section 2 constructed of a microprocessor or the like, a memory 3 that is connected to the control section 2 and stores programs and various kinds of data, a map information storage section 4 that is also connected to the control section 2 and stores the digital data of maps, and a voice recognition section 5 that recognizes voice signals entered from a microphone 8 (voice input device). The control section 2 has a function that controls a display device 6 connected to the main device 1 and displays route information and road information necessary for navigation on the display device 6. As for the display device 6, a liquid crystal display device is generally used but all types of display devices can be used. The display device 6 may be integrated with the main device 1 or may be integrally embedded in a portion of interior surface of a vehicle.

The control section 2 calculates the position of this apparatus itself by a calculation method using a publicly known technology from signals that are sent by a plurality of satellites and received by a GPS (Global Positioning System) antenna 7. The microphone 8 (voice input device) converts user's voice into an electric signal and outputs the electric signal to the voice recognition section 5. The speaker 9 outputs voices, effect sounds, and sounds of music on the basis of the control of control section 2.

The interface 10 has a function of relaying the operational status signals of electronic devices of the car and control signals to these electronic devices, for example, a control device of an air conditioner, head lights, and sensors for detecting the on-off states of a wiper and the head lights (all of which are not shown), between the control section 2 of the apparatus and these electronic devices.

A user interface may be provided including an input device 11 and a display device 6. The input device 11 is a device to detect a command from a user and to output a signal corresponding to this command to the control section 2. This input device 11 can comprise any of various types of input devices capable of converting a user's command into a signal, for example, one or a plurality of buttons, a tablet, a touch sensor mounted on the display device 6, a joystick, and a lever mounted on a vehicle body.

Figure 2:
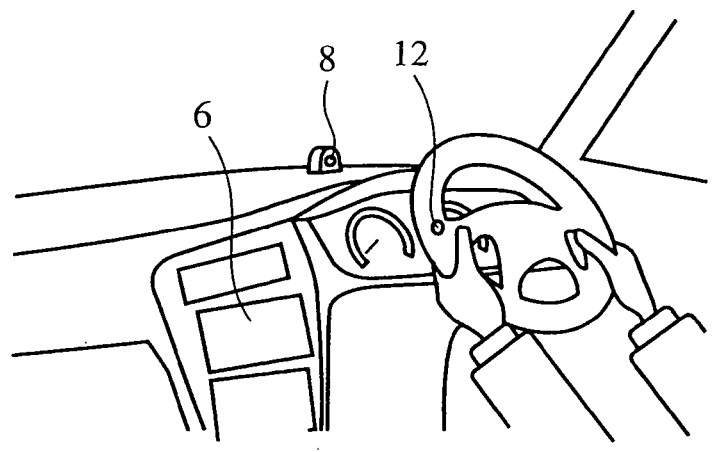
FIG. 2 is a perspective view to show the driver's seat of a vehicle on which is mounted the vehicle mounted control apparatus in accordance with embodiment of the present invention.

FIG. 2 is a perspective view of the driver's seat of a vehicle to which a vehicle mounted control apparatus in accordance with this embodiment is applied.

A conversation starting switch 12 is a device for outputting to the control section 2 a signal to inform that the switch 12 is pressed by the user when it is pressed by the user. The microphone 8 is mounted in a position where driver's voice can be easily input, for example, on a dashboard forward of the driver's seat, and the conversation starting switch 12 is mounted in a position where the user can easily press it during driving the vehicle without interfering with driving the vehicle, for example, on a steering wheel.

This vehicle mounted control apparatus has two operation modes of a command execution mode and an operation guidance mode.

First, the command execution mode is a mode for performing an ordinary operation. In the command execution mode, when a user inputs voice to the apparatus, the voice recognition section 5 recognizes a voice command from the user and the control section 2 executes a processing corresponding to the voice command. By this command execution mode, it is possible to control various kinds of vehicle mounted electronic devices, for example, to set a destination and to start a route guidance in navigation, and to control air volume of an air conditioner and an audio device, and to control electronic devices provided outside the vehicle through the Internet, such as an electronic device for electronic mail and Internet ITS (Intelligent Transport Systems).

On the other hand, the operation guidance mode is a mode for giving the user a description of a method for performing voice input and the user can recognize the operating procedure and voice command of the vehicle mounted apparatus without looking at an operating manual. At this point, switching between the command execution mode and the operation guidance mode can be performed, for example, by pressing a selector button or by selecting a menu displayed on the display device 6.

FIG. 3 is a flow chart of control section 2 that shows the command execution mode and the operation guidance mode. First, when the vehicle mounted apparatus is started, an initial screen at startup is displayed (step ST1). The control section 2 displays a message of "Please select a user" on the initial screen and displays a list of a plurality of users previously registered in the memory 3. The user looking at this display selects his own name from the list and inputs to the input device 11. The control section 2 detects a signal input to the input device 11 and identifies the user on the basis of this signal (step ST2).

Next, the control section 2 detects an input signal from the input device 11 or the conversation starting switch 12 and checks whether this input signal is a signal to select executing an operation guidance mode or a signal to select executing a processing of command execution mode (step ST3). Here, when the user presses down the conversation starting switch 12, the control section 2 executes the processing of command execution mode at steps ST4 to ST8. On the other hand, when the user selects the operation guidance mode, the control section 2 executes a processing of operation guidance mode at steps ST10 and ST11.

First, the operation of vehicle mounted apparatus in the command execution mode will be described.

Figure 4A:
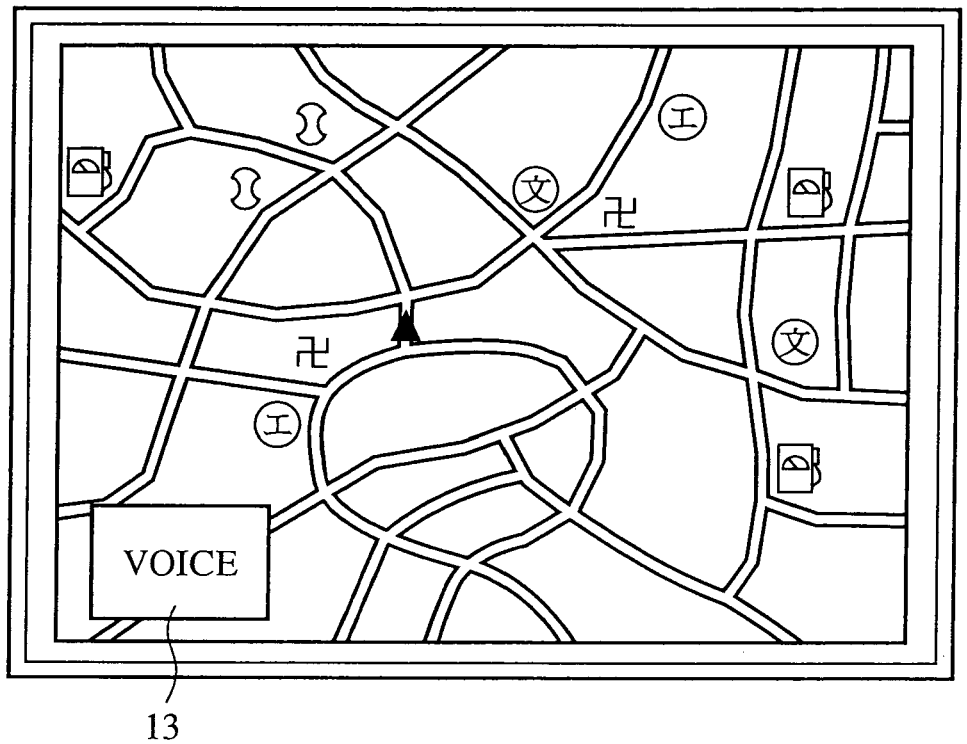
FIGS. 4A, 4B are illustrations to show the display content of a display device in the vehicle mounted control apparatus in accordance with embodiment of the present invention.

First, the control section 2 waits for an input signal from the input device 11 and/or the input of voice command from the microphone 8 (step ST4) and at the same time, as shown in FIG. 4A, displays on the screen a "voice reception state icon" 13 of "VOICE" to show a state of reception of voice command.

When the user inputs voice to the microphone 8, the voice recognition section 5 recognizes the input voice. At this time, the voice recognition section 5 reads a recognition parameter for the user identified at step ST2 from the memory 3 and recognizes the voice by the use of this parameter (step ST5). For example, in a case where the user desires to retrieve a near gas station, when the user utters a voice command of "Near gas station", a voice command "Near gas station" is input from the microphone 8.

Next, the control section 2 identifies which command of a plurality of voice commands that can be acceptable to the apparatus is uttered by the user. If the control section 2 can identify the voice command input, the control section 2 determines that the state of voice of voice command is good and executes a processing corresponding to the identified voice command (step ST7).

Figure 4B:
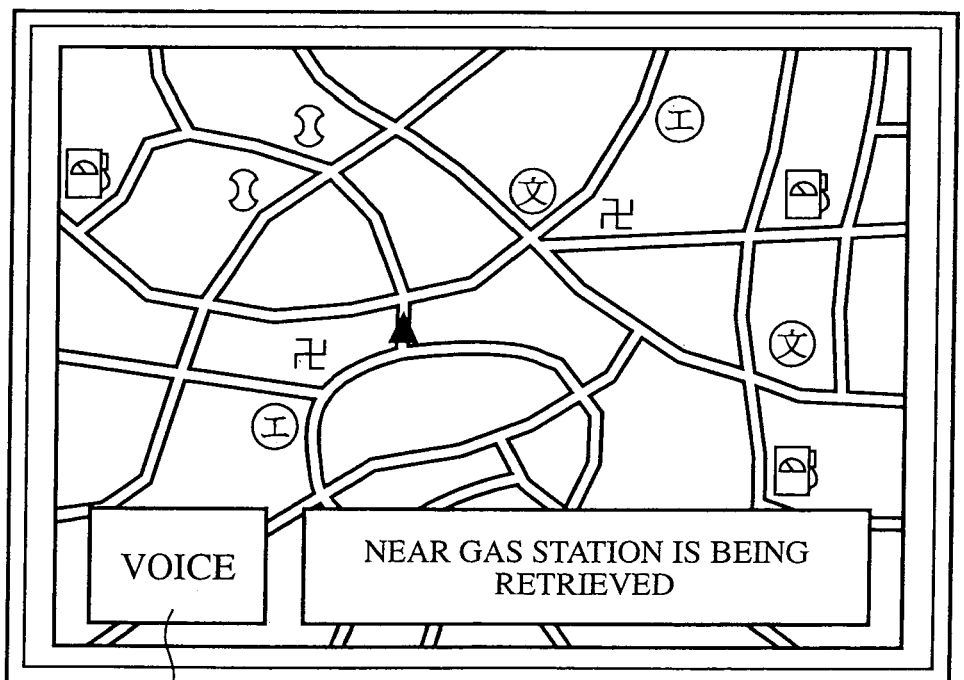

Here, "Near gas station" is input by the user as the voice command, so the vehicle mounted apparatus recognizes the voice command and hence retrieves a near gas station and displays the result of retrieval. In this regard, as shown in FIG. 4B, in order to show the state of operation to the user, "Near gas station is now being retrieved" is displayed during the operation.

Figure 5:
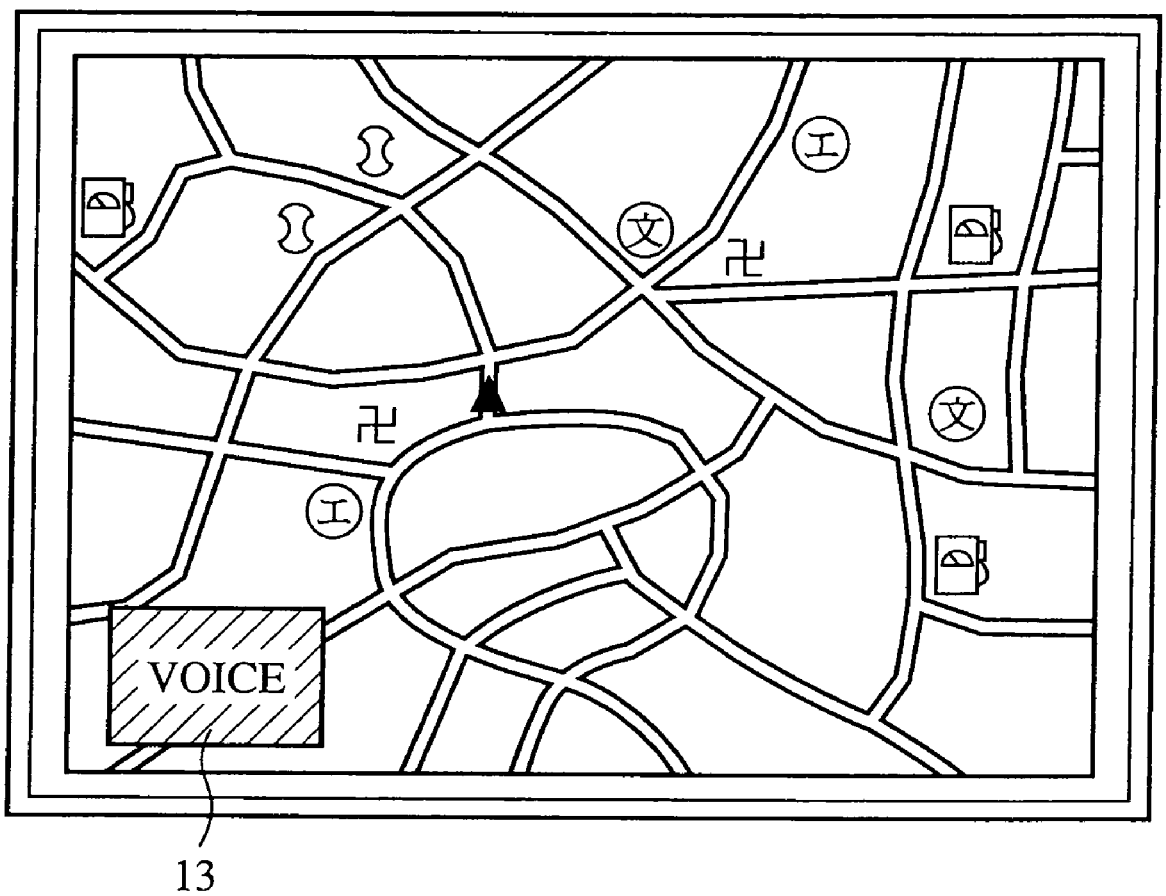
FIG. 5 is an illustration to show the display content of the display device in the vehicle mounted control apparatus of embodiment of the present invention and illustrates a change in the display mode of a screen.

On the other hand, when the control section 2 cannot identify the voice command input, the control section 2 determines that a state of voice for the voice command is not good and analyzes the reason of the state of voice not good (step ST8). At this point, the analysis of the reason state of voice not good will be described later in detail. Further, the control section 2 changes display on the screen of display device 6 (step ST9) on the basis of the analysis results of state of voice which is shown in FIG. 5 with slanted lines, for example, change of color (meaning will be described later) and again waits for a voice command to be input (step ST3).

Here, changing display on the screen means displaying an icon corresponding to the state of voice, changing the color of an icon or the whole screen which are already displayed in response to the state of voice, blinking the icon or the whole screen which are already displayed (in this case, an interval of blinking or the pattern of blinking is changed in response to the state of voice), displaying the state of voice as character information, and further using these operations in combination. In this regard, any display method can be employed as far as the user can visually recognize the state of voice when the user looks at the screen of display device 6.

Finally, the control section 2 detects on the basis of an electric signal or the like from the input device 11 or a power supply key via the interface 10 whether or not the user performs an operation of finishing a processing of vehicle mounted apparatus (step ST12). At this point, when the user does not perform the operation of finishing, the control section 2 repeats the processing following step ST3. On the other hand, when the user performs the operation of finishing, the processing is finished.

Next, the operation of vehicle mounted apparatus in the operation guidance mode will be described. At this point, for the sake of convenience in description, a case where a facility is retrieved so as to set a destination will be described as an example.

Figure 6A:
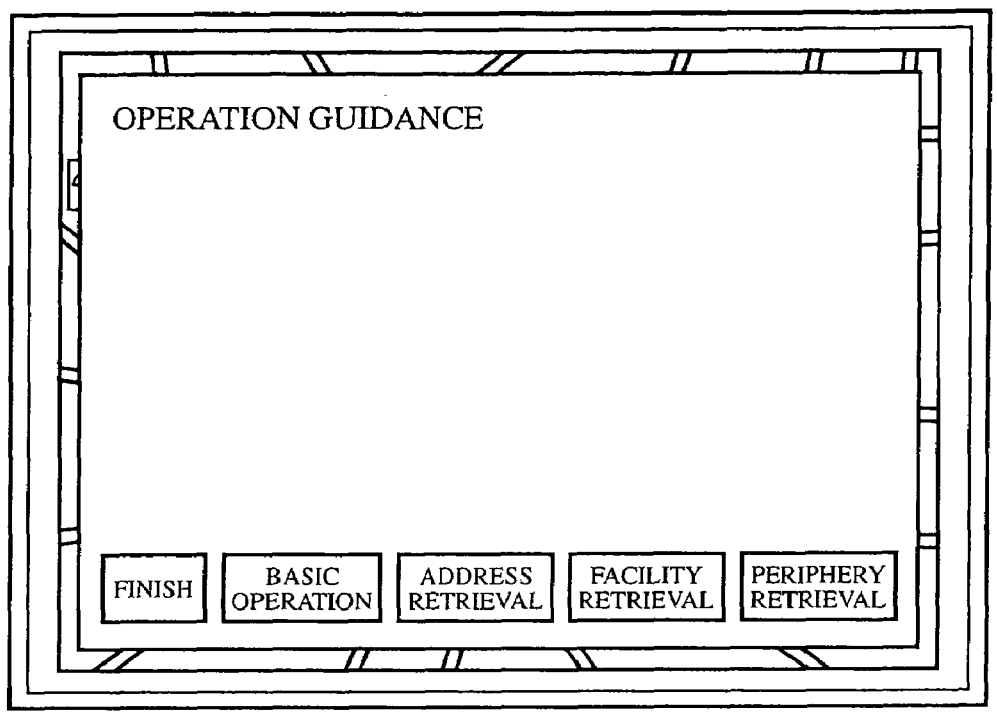
FIGS. 6A, 6B are illustrations to show the display content of a display device in the vehicle mounted control apparatus in accordance with embodiment of the present invention.

When the user selects the operation guidance mode, the control section 2 displays an initial screen on the display device 6 (step ST10) as shown in FIG. 6A. This initial screen is a screen to provide the user with a menu capable of giving the user guidance on operation by the use of operation guidance mode. In this case, the operation guidance mode includes "basic operation", "address retrieval", "facility retrieval", and "periphery retrieval".

Figure 6B:
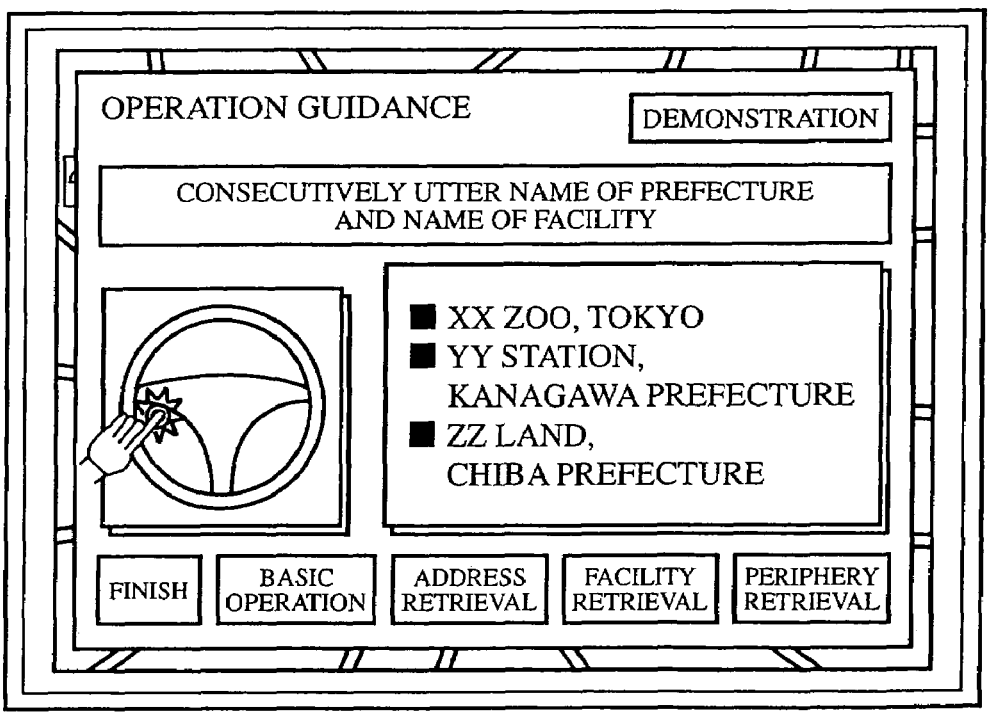

Next, the control section 2 detects a command input to the input device 11 by the user, and when the command is "facility retrieval", the control section 2 displays an operation describing screen shown in FIG. 6B (step ST11). In this display of describing operation, the control section 2 reads from the memory 3 a method of uttering a voice command relating to the selected command and displays it on the display device 6. Since "facility retrieval" is selected in this case, the control section 2 displays "Utter the names of the prefecture and the name of facility consecutively" as the method of uttering the voice command corresponding thereto, and receives input of voice command by the user.

At this point the operation guidance mode is usually performed firstly when use of the control apparatus of the present invention is begun, and in such a case input of user name to be registered in the memory 3 is performed through the input device 11 at step ST2, and the control section 2 stores the voice command input at the above described operation guidance mode by the user in memory 3 as a specific standard pattern of the voice recognition parameters for the registered user.

Moreover, the control section 2 reads from the memory 3 an example sentence of a voice command relating to the command now selected and displays the example sentence on the display device 6. Since "facility retrieval" is selected in this case, "XX Zoo, Tokyo", "YY Station, Kanagawa Prefecture" and "ZZ Land, Chiba Prefecture" are displayed as example sentences. Here, it is also recommended that the displayed sentence is output as voice from the speaker 9 to make the user recognize the sentence as voice.

In this regard, it is also recommended that when the control section 2 detects "to look at demonstration" as a command input to the input device 11 by the user, as shown in FIG. 6B, general operation including the operation of input device 11 (for example, "to press the conversation starting switch" at the time of inputting voice) be described. That is, in this case, when the user utters "the name of prefecture" and "the name of facility", the user needs to press the conversation starting switch 12 and hence in order to make the user know that he needs "to press the conversation starting switch at the time of inputting voice", it is visually displayed.

Next, the operation of analysis of the state of voice will be described.

Assume that the user issues a voice command while pressing the conversation starting switch 12. When the control section 2 detects that the conversation starting switch 12 is pressed down, the control section 2 records voice received by the microphone 8 in the memory 3 while detecting the switch 12 continues to be pressed down.

Next, when the control section 2 detects finish of detection that the conversation starting switch 12 is pressed down, the control section 2 finishes recording the voice in the memory 3 and instructs the voice recognition section 5 to analyze the recorded voice. The voice recognition section 5 analyzes the features of voice according to a publicly known voice recognition algorithm and records the analysis results in the memory 3. For example, the voice recognition section 5 compares the standard pattern of voice of the user previously stored in the memory 3 with the pattern of input voice to analyze a plurality of features, for example, sound level, uttering speed, uttering timing, and whether or not unnecessary words (hereinafter referred to as "incidental word") are included and outputs analysis results.

Next, the control section 2 determines whether or not the state of input voice is good on the basis of analysis results. Any parameter which shows the ease of voice recognition, can be used to determine whether or not the state of input voice is good. For example, when it is detected that any one of sound level, uttering speed, uttering timing, and the presence or absence of incidental words is "not good", the control section 2 determines that total analysis result is "not good". On the other hand, when all the analysis results for each item of analysis are "good", the control section 2 determined that total analysis result is "good".

Here, when the control sections 2 determines that the analysis result is good, as described above, the control section 2 executes the recognized voice command. On the other hand, when the control sections 2 determines that the analysis result is "not good", as described above, the control section 2 changes the display of screen on the basis of display format associated with the analysis result. The analysis result corresponds to the display format in a manner shown in FIG. 7 and this correspondence is stored in the memory 3. For example, when the control section 2 recognizes that the analysis result is "not good" because "sound level is high", the control section 2 refers to a state-of-voice correspondence table stored in the memory 3 and recognizes that a color corresponding to a case of "sound level is high" is "blue". Further, the control section 2 changes the color of an icon displayed on the screen, for example, the color of the above described icon 13 of "VOICE" to show the state of reception of voice, is changed "blue" in this case as a state shown in FIG. 5 with slanted lines and again waits for an input of command by voice. At this point, the icon on which the change of display format is performed, is not limited to the icon 13 of "VOICE" to show the state of reception of voice but may be an icon to show the present position. Further, the whole screen may be changed to blue.

Here, in the analysis results, "sound level is high" and "sound level is low" are the analysis results from a viewpoint of "sound level", and "conversation speed is high" and "conversation speed is low" are the analysis results from a viewpoint of "conversation speed", and "conversation timing is early" and "conversation timing is late" are the analysis results from a viewpoint of "conversation timing". Hence, as for a color corresponding to the analysis results from the same viewpoint, a color of the same group may be used. That is, as described above, "sound level is high" and "sound level is low" are the analysis results from a viewpoint of "sound level", so they are displayed in a color of the same group, for example, "sound level is high" is displayed in "blue" and "sound level is low" is displayed in "greenish sky blue". Further, when a level is higher than a standard, for example, "high" and "early", a dark color is used and when a level is lower than a standard, for example, "low" and "late", a light color is used. With this, the user understands what is wrong from the group of color and can get a sense of "higher than a standard" or "lower than a standard" from the shades of gray.

Next, an analysis of voice will be described in detail.

For example, whether the input voice is good or not is determined by the following method.

(1.) Incidental Word at the Beginning of Sentence

The voice recognition section 5 compares the standard pattern of an incidental word stored in the memory 3 with the input voice and produces an output to the effect that analysis result is "not good" when the beginning of voice is in good agreement with the standard pattern of incidental word. On the other hand, when the voice does not have any incidental word at the beginning of voice, the voice recognition section 5 produces an output to the effect that analysis result is "good".

(2) Sound Level

The voice recognition section 5 detects whether or not the sound level of input voice is within a predetermined range and produces an output to the effect that analysis result is "not good" when the sound level is not within the predetermined range. On the other hand, when the sound level is within the predetermined range, the voice recognition section 5 produces an output to the effect that analysis result is "good". The predetermined range is set at a range of less than 0 dB to −30 dB when the maximum value of sound level to be detected by the microphone 8 is 0 dB.

(3) Conversation Pace

The voice recognition section 5 measures the length of time of the input voice and compares this length of time with the length of time of the standard pattern and determines that the conversation pace is good when a difference between them is within a predetermined range.

This predetermined range can be arbitrarily set and, for example, a difference of the length of time of the input voice can be set at a range of +25% to −25% of the length of time of the standard pattern.

(4) Uttering Timing

The voice recognition section 5 determines whether or not the uttering timing of input voice is within a predetermined range of voice acceptable timing. At this point, the voice recognition section 5 produces an output to the effect that analysis result is "good" when the uttering timing is within the predetermined range. On the other hand, when the uttering timing is not within the predetermined range, the voice recognition section 5 produces an output to the effect that analysis result is "not good". For example, when voice has been begun to input at the beginning of a period during which the microphone 8 can acquire the voice, the voice recognition section 5 produces an output to the effect that analysis result is "not good". On the other hand, in cases where the input voice has not yet completed to utter for a period more than the maximum input time of voice command or where a voice input is detected only at the end of the above described period during which the microphone 8 can acquire the voice, the voice recognition section 5 produces an output to the effect that analysis result is "not good". In the cases other than these cases, the voice recognition section 5 produces an output to the effect that analysis result is "good".

(5) Incidental Word at the End of Sentence

As is the case with the detection of an incidental word at the beginning of a sentence, the voice recognition section 5 detects whether or not there is an incidental word at the end of a sentence. When the voice recognition section 5 detects an incidental word, the voice recognition section 5 produces an output to the effect that analysis result is "not good". On the other hand, when the voice recognition section 5 does not detect an incidental word at the end of sentence, the voice recognition section 5 produces an output to the effect that analysis result is "good".

Next, a set of example sentences will be described in detail. FIG. 8 is a list in which the contents of voice commands are correlated with example sentences that the user utters so as to execute the respective voice commands.

The sentences of the contents (a) to (e) of voice commands, shown in this drawing, include a plurality of commands of different diction and the voice recognition section 5 can recognize voice commands on the basis of a plurality of voices uttered by the different diction.

In this regard, while the above description has been given with a particular emphasis on the car navigation apparatus, the vehicle mounted control apparatus of the present invention is not limited to this example but the present invention can be applied to any type of vehicle mounted control apparatus for operating electronic devices inside and outside of the vehicle. For instance, the vehicle mounted control apparatus includes of a control apparatus for controlling vehicle mounted electronic devices, for example, an air conditioner, an audio unit and the like. Moreover, as a control apparatus for controlling electronic devices outside of the vehicle may be thought, for example, a control apparatus for controlling various kinds of electronic devices outside of the vehicle through a transmitter which is connected to the interface 10. The electronic devices outside of the vehicle include all kinds of electronic devices which are connected by a communications lines, for example, an air conditioner intended for home use or commercial use, a home security system, a home server, other electric appliances, an automated paying machine installed at a store such as a fast food store or a gas station, and a gate installed at the entrance and exit of a parking lot.

Further, in the control apparatus in FIG. 1, while an example has been shown as the voice recognition section 5 which is constructed of an LSI for voice recognition, the voice recognition section 5 is not limited to a case where it is constructed of a hardware circuit designed exclusively for voice recognition but may employ a software program for voice recognition. In this case, the program for voice recognition is executed by the control section 2 or a separate processor used exclusively for voice recognition.

Still further, in the above embodiment, while an example of the voice recognition processing is given in which the voice recognition section 5 performs voice analysis as a preliminary processing and the control section 2 executes a processing of displaying advice by use of the result of analysis, but the control section 2 can executes also the voice analysis itself.

Still further, in the above described embodiment, while the recognition parameters of a plurality of users are registered, because there also cases where only one specified user uses the control apparatus, it is not always necessary to classify the users when there is no specific need. In a case where only one specified user uses the control apparatus, a processing of registering users a step ST2 in FIG. 3 is not required.

As for the memory 3, a volatile and/or nonvolatile memory can be used. Moreover, a storage device such as a hard disk and DVD-RAM can be used as storage device.

INDUSTRIAL APPLICABILITY

As described above, a vehicle mounted control apparatus in accordance with the present invention is applicable to a car navigation apparatus.

What is claimed is:

1. A vehicle mounted control apparatus comprising:
a switch accessible by a driver of a vehicle, the switch being actuated by the driver to select executing a command execution mode;
a voice command receiver inside the vehicle that receives a voice command input when the command execution mode is executed;
a voice recognition section operably connected to the voice command input device for recognizing the voice command input by the voice receiver;
a user interface on an interior surface of the vehicle, the user interface being actuated by a nonverbal input by the driver to select executing an operation guidance mode, the user interface including a display device that provides visual operation guidance to the driver regarding the command execution mode when the operation guidance mode is executed;
a control section operably connected to the switch and the user interface, the control section executing the command execution mode in response to the driver actuating the switch, the control section executing the operation guidance mode in response to the driver actuating the user interface by the nonverbal input,
wherein, when the voice command cannot be recognized by the voice recognition section, the control section performs the following:
determines a cause of incapability of recognition of the voice command,
causes the display device to display a visual notice indicating to the driver the determined cause of the incapability of recognition as a result of the driver visually recognizing the visual notice as representing a particular one of a plurality of distinct causes of incapability of recognition; and
a command execution section that executes the voice command when the voice command is recognized by the voice recognition section.

2. The vehicle mounted control apparatus as claimed in claim 1, wherein said visual notice is displayed by a change of a display format on the display device.

3. The vehicle mounted control apparatus as claimed in claim 2, wherein the display format is a display format of an icon displayed on the screen.

4. The vehicle mounted control apparatus as claimed in claim 3, wherein the display format of the icon is a color of the icon displayed on the screen.

5. The vehicle mounted control apparatus as claimed in claim 1, wherein:
the display device operates as an operation guide that displays a menu providing guidance on operation and guidance on a selected operation when the control section executes the operation guidance mode.

6. The vehicle mounted control apparatus of claim 1, wherein:
the plurality of distinct causes of incapability of recognition comprise:
sound level is too high;
sound level is too low;
uttering speed is too fast; and
uttering speed is too slow, and
the apparatus includes a memory device storing a different type of visual notice in association with each of the plurality of distinct causes of incapability of recognition, and when the voice command cannot be recognized by the voice recognition section, the control section performs the following:
reads the distinct type of visual notice stored in association with the determined cause of incapability of recognition from the memory device; and
causes the display device to display the distinct type of visual notice.

7. A vehicle mounted control apparatus comprising:
a switch accessible by a driver of a vehicle, the switch being actuated by driver to select executing a processing of command execution mode;
a voice command receiver inside the vehicle that receives a voice command input when the command execution mode is executed;
a voice recognition section operably connected to the voice command receiver for recognizing the voice command input by the voice receiver;
a user interface on an interior surface of the vehicle, the user interface being actuated by the driver to select executing an operation guidance mode, the user interface including a display device that provides visual operation guidance to the driver regarding the command execution mode when the operation guidance mode is executed;
a control section operably connected to the switch and the user interface, the control section executing the command execution mode in response to the driver actuating the switch, the control section executing the operation guidance mode in response to the driver actuating the user interface,
wherein the control section performs an analysis to determine a particular cause of incapability of recognition of the voice command when the voice command cannot be recognized by the voice recognition section; and
a storage section that stores a correspondence between different display formats and different causes of incapability of recognition by the voice recognition section, respectively, such that each of the display formats corresponds to a respective one of the different causes according to the stored correspondence,
wherein the control section reads the display format corresponding to the particular cause determined by the result of analysis from the storage section and causes the display device to display a visual notice indicating to the driver the particular cause by changing a screen of the display device to exhibit the read display format.

8. The vehicle mounted control apparatus as claimed in claim 7, wherein the display format is a display format of an icon displayed on the screen.

9. The vehicle mounted control apparatus as claimed in claim 8, wherein the display format of the icon is a color of the icon displayed on the screen.

10. The vehicle mounted control apparatus of claim 7,
wherein the control section displays a sample of a voice command on a screen of the display device when the operation guidance is executed, the sample corresponding to the voice command to be input when the command execution mode is executed.

11. The vehicle mounted control apparatus as claimed in claim 10, wherein:
the display device operates as an operation guide that displays a menu providing guidance on operation and guidance on a selected operation when the control section executes the operation guidance mode.

12. The vehicle mounted control apparatus as claimed in claim 7, wherein:

the display device operates as an operation guide that displays a menu providing guidance on operation and guidance on a selected operation when the control section executes the operation guidance mode.

13. The vehicle mounted control apparatus of claim 7, wherein:
the different causes of incapability of recognition of the stored correspondence comprise:
sound level is too high;
sound level is too low;
uttering speed is too fast; and
uttering speed is too slow.

14. A method implemented by a vehicle mounted apparatus which includes a switch accessible by a driver of a vehicle, a voice command receiver inside the vehicle, a user interface including a display device on the interior surface of the vehicle, the method comprising:
utilizing one or more microprocessors to perform the following:
executing a command execution mode in response to the switch being actuated by the driver;
performing voice recognition on a voice command which is received by the voice command receiver when the command execution mode is executed;
if the voice command cannot be recognized by the voice recognition,
performing an analysis determining a particular cause of incapability of recognition of the voice command, and
causing the display device to display a visual notice indicating to the driver the determined cause of the incapability of recognition on the result of the analysis as a result of the driver visually recognizing the visual notice as representing a particular one of a plurality of candidate causes of incapability of recognition; and
if the voice command is recognized by the voice recognition, executing the voice command;
executing an operation guidance mode in response to the user interface being actuated by the driver by a nonverbal input; and
causing the display device to display visual operation guidance to the driver regarding the command execution mode when the operation guidance mode is executed.

15. The method of claim 14, wherein:
the vehicle mounted apparatus includes a memory device which stores a correspondence between different display formats and different causes of incapability of recognition by the voice recognition section, respectively, such that each of the stored display formats corresponds to a respective one of the different causes according to the stored correspondence, and
the method further comprises utilizing the one or more microprocessors to perform the following if the voice command cannot be recognized by the voice recognition:
read the display format corresponding to the particular cause determined by the result of analysis from the memory device; and
cause the display device to display the visual notice of the particular cause by changing a screen of the display device to exhibit the read display format.

16. The method of claim 14, wherein the visual notice is displayed by changing a display format on a display device of the user interface.

17. The method of claim 16, wherein the display format is a display format of an icon displayed on the screen.

18. The method of claim 16, wherein the display format of the icon is a color of the icon displayed on the screen.

19. The method of claim 14, the method further comprising utilizing the one or more microprocessors to:
display a sample of a voice command on a screen of the display device when the operation guidance is executed, the sample corresponding to the voice command to be input when the command execution mode is executed.

20. The method of claim 14, the method further comprising utilizing the one or more microprocessors to:
causing the display device to display a menu providing guidance on operation and guidance on a selected operation when the control section executes the operation guidance mode.

* * * * *